Sept. 19, 1950 — M. G. CROSBY — 2,522,863
FREQUENCY MODULATION DISTANCE FINDER
Filed Nov. 15, 1945
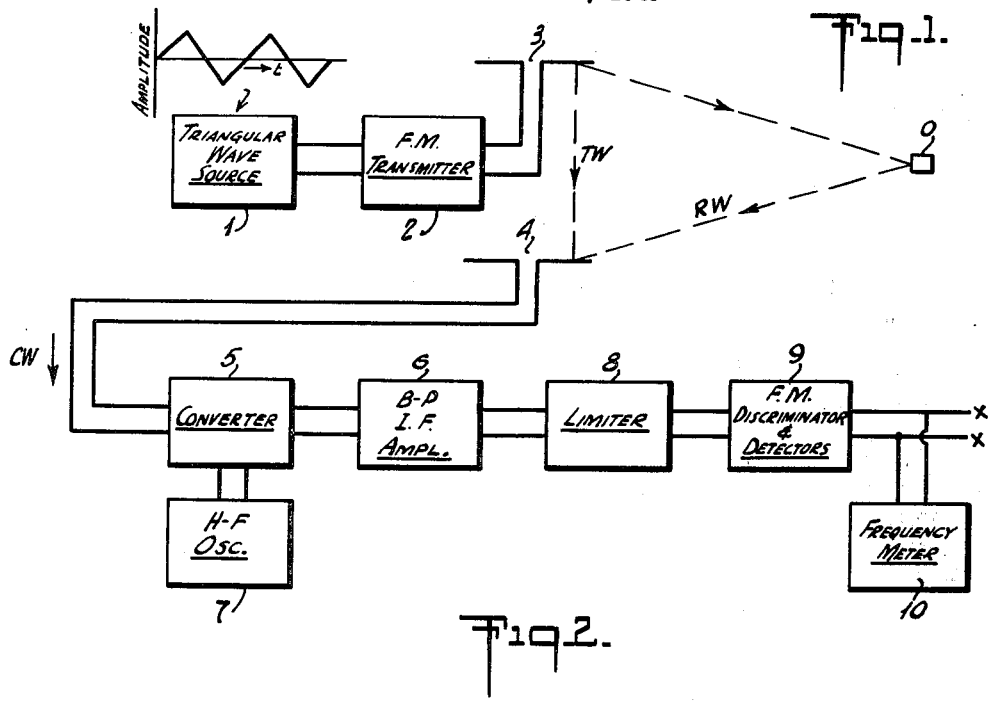
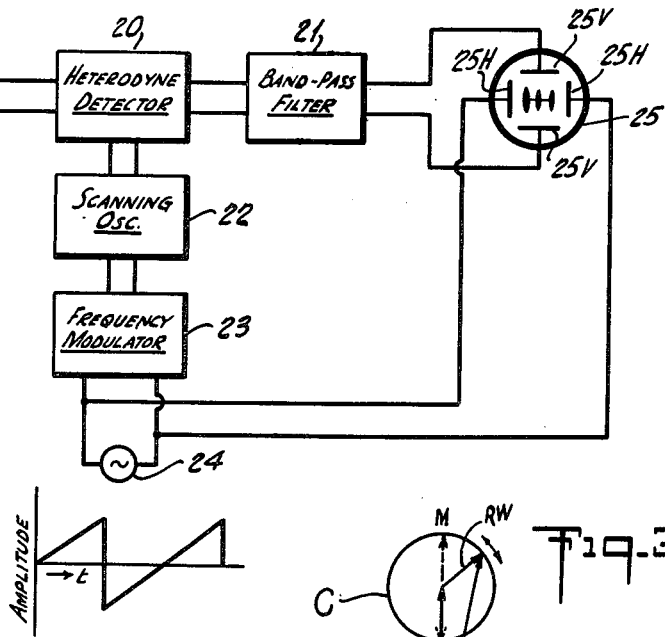
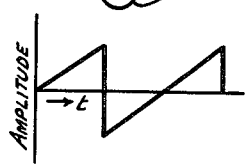
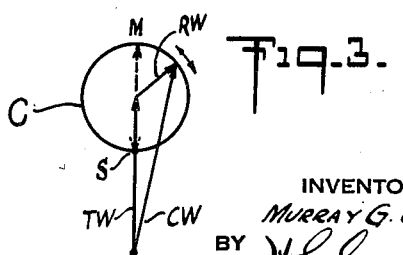
INVENTOR
MURRAY G. CROSBY
BY
ATTORNEY

Patented Sept. 19, 1950

2,522,863

UNITED STATES PATENT OFFICE 2,522,863

FREQUENCY-MODULATION DISTANCE FINDER

Murray G. Crosby, Upper Montclair, N. J., assignor to Radio Corporation of America, a corporation of Delaware Application November 15, 1945, Serial No. 628,921

4 Claims. (Cl. 343—14)

1

This invention relates to a distance finder making use of a continuous-wave frequency-modulated type of transmitter. The invention is particularly characterized, however, by the utilization of the angle, frequency or phase modulation component of the beat notes obtained from the interaction between the transmitted wave and the wave reflected from the object, for distance determination.

In the prior art of the frequency-modulated type of distance finder, the beat notes obtained between the transmitted and reflected waves were detected by means of the conventional amplitude-modulation detector. With this type of detection, the high frequency beat note, which corresponds to the greater object distance, is detected with the same efficiency as the low-frequency beat note which corresponds to the shorter object distance. This is a disadvantage because the indication produced by a closer object is much stronger than that produced by a more distant object. It would be advantageous to obtain equal indication from all distances since the distance is indicated only by the frequency of the beat note and is independent of the amplitude.

One method of equalizing the amplitude of the indications from the various distances is by the use of an equalizing network in the detected output of the beat notes so that attenuation is inserted in the range of the lower beat note frequencies corresponding to the closer distances. Automatic volume control may also be utilized to equalize the amplitudes. These controls have, obviously, many structural and operational disadvantages.

In the system of this invention, the phase modulation components of beat notes are utilized in a frequency-modulation receiving system. The latter inherently inserts an attenuation in this phase modulation component of the beat note output such that the output amplitude is proportional to the beat note frequency. In addition the well-known advantages of frequency - modulation reception are obtained. These advantages include a greater freedom from noise and other undesired modulations and the possibility of using class C amplification in the receiver.

As indicated hereinabove, the basic principle upon which frequency-modulation distance finders operate is dependent upon the combination of the transmitted and reflected modulated waves. This combination of two waves produces a beat note which has two components of modulation. One of these components of modulation is the amplitude-modulation component. This component heretofore has been utilized exclusively, as far as I am aware, in prior distance finders. To effect this utilization, the combina-

2 tion of the transmitted and reflected waves is detected in an amplitude-modulation detector to obtain the beat note which exists as an amplitude-modulation on the envelope of the combined waves. This beat note is detected and fed to the frequency meter indicating means.

By use of triangular wave form frequency-modulation at the transmitter, the beat note frequency is proportional to the phase difference between the transmitted and reflected waves. This phase difference is proportional to the distance the wave traverses in its transmission from the transmitting antenna to the object and back to the receiving antenna. Consequently, a frequency indicating device subjected to the detected amplitude modulation component of the beat waves gives an indication which is proportional to distance.

In the system of the present invention the amplitude-modulation component, which has been used in prior art devices, is removed by means of a limiter such as described in Wright and Smith, Patent 1,964,375, Foster et al. U. S. Patent 2,273,097 or my U. S. Patent 2,276,565. After limiting, the remaining component is a phase-modulation component produced by a combination of the transmitted and reflected waves. This phase-modulation component is fed to a frequency-modulation discriminator and detecting system and is thereby subjected to a frequency demodulation. The detected output of the frequency-modulation detecting system is a beat note of the same general type as that obtained by the amplitude-modulation detecting methods, but has an amplitude characteristic such that the amplitude is proportional to the beat-note frequency. This amplitude characteristic is desirable since it tends to compensate for the opposite type of amplitude characteristic brought about by the fact that distances resulting in low beat-note frequencies are produced by nearby objects which have less attenuation in the transmission path.

In the accompanying drawings which are only illustrative of my invention, Fig. 1 diagrammatically illustrates one form of my invention wherein the phase modulation component, as distinguished from the heretofore employed amplitude modulation component, of direct and reflected waves is subjected to a frequency demodulation process for distance determination, Figure 2 is a modification utilizing the principles of Figure 1 and wherein the distances to a plurality of objects may be determined simultaneously, and Figure 3 is a vector diagram explanatory of the operation of my present distance finder system.

Figure 1 shows how the principle of my present invention may be applied. Triangular wave source 1 frequency modulates the output of frequency-modulation transmitter 2 for radiation on antenna 3. That is, the wave radiated from antenna 3 is of substantially constant amplitude but angle, and more specifically, frequency modulated in accordance with the triangular shaped waves from source 1.

The wave reflected from object O is received on receiving antenna 4 in combination with local frequency modulated energy or waves direct from transmitting antenna 3. Converter 5, in conjunction with high frequency oscillator 7, heterodynes the received combination to an intermediate frequency suitable for amplification in band-pass intermediate frequency amplifier 6. The latter may employ vacuum tubes operated as class "C" amplifiers. The intermediate energy is limited to constant output amplitude in a limiter 8, such as described in my U. S. Patent 2,276,565, and fed to frequency-modulation discriminator and detector unit 9.

The limiter wipes out the amplitude modulation components in the intermediate frequency waves and feeds to the discriminator detector system 9 intermediate frequency waves having angle or phase modulation components representative of the distance between the transmitting antenna 3 and reflecting object O.

For direct distance indication from a single object, the output of 9 is fed to frequency meter 10 which may be calibrated in distance units. The discriminator detector system may be of the type and employ the principles of my U. S. Patent 2,229,640 or of the Patent to S. W. Seeley 2,121,103 or of my Patent 2,071,113.

Figure 2 shows a scanning circuit for connection to the frequency-modulation detector unit 9 at points X—X. This type of device is suitable for measuring the distance to more than a single object. With more than one object at various distances, several beat notes will result. These beat notes may be resolved to indicate the respective distances to the objects by means of the scanning system shown. The beat notes are fed to the input of heterodyne detector 20 which, in conjunction with scanning oscillator 22, heterodynes the beat notes to pass through band-pass filter 21.

The scanning oscillator is frequency-modulated with a saw-tooth wave form from generator 24, which also is applied to the horizontal plates 25H of oscilloscope tube 25. The vertical plates 25V of the oscilloscope tube are fed from the output of band-pass filter 21.

The band-pass filter 21 must be narrow enough to separately select the beat notes one from the other. Since the beat notes of two close objects will be near the same frequency, it is apparent that the width of the filter must be such that it will separate beat notes corresponding to a certain predetermined minimum separation that the system is designed to resolve. For a given object distance separation, the frequency difference between the beat notes depends upon the magnitude and rate of the frequency sweep of the triangularly modulated frequency modulation transmitter. These things must be taken into consideration in choosing the filter band width. Also, the filter must not be too narrow or the beat notes will not have time to build up to full amplitude as the scanning system sweeps them past the input of the filter.

With the scheme of Figure 2 the scanning may be arranged so that a low beat note frequency, corresponding to a short distance, occurs at the beginning of the linear sweep produced by the saw-tooth wave form on the horizontal oscilloscope plates. Higher frequency beat notes, corresponding to greater distances, appear at a later time in the cycle of the linear sweep, and therefore, are displaced on the horizontal axis of the oscilloscope a distance proportional to the object distance. In this way a "radar" system of the frequency modulation type is secured.

The underlying method of operation may more clearly be understood by reference to the vector diagram of Figure 3. The transmitted wave radiated from antenna 3 is represented by the vertical vector TW which may validly be considered as a reference point. The reflected wave from the object O is, obviously, lesser in magnitude and is represented by the vector RW. These two vectors combine to form a combined wave or resultant CW which varies in amplitude and phase depending upon the instantaneous position of the reflected wave RW with respect to the transmitted wave TW. The locus of the arrow extremity of CW is the circle C. The combined wave has a maximum intensity when the vector TW and the vector RW are in alignment and the arrow of the reflected wave RW is at point M. The resultant has minimum amplitude when the arrow of the reflected wave RW is at point S. The maximum phase shift in the combined wave or resultant CW occurs at the positions where the vector RW is perpendicular to the vector CW.

As before explained, the limiter 8 operates to eliminate the amplitude changes in the resultant or combined wave CW and the system becomes responsive only to the phase shift in the combined wave CW produced by the combination of RW and TW. This phase shift or phase modulation occurs at the beat frequency between RW and TW.

It will be noted from the vector diagram that the modulation remaining after the limiting process is a phase modulation while the receiver of the present invention uses a frequency modulation detecting system. This difference brings about the advantage of the invention whereby more distant objects effect a greater indication response. The inherent difference between frequency and phase modulation is such that if a phase-modulation wave is received on a frequency-modulation receiver, the detected output will have an amplitude proportional to its frequency. If the modulation frequency is $F_m$ and the phase deviation in radians $P_r$, the effective frequency deviation, $F_d$ is given by the relation $$F_d = P_r F_m$$

Thus the output of a frequency modulation receiver, which linearly responds to the frequency deviation, $F_d$, is proportional to the modulation frequency, $F_m$.

In the system of the present invention, the distance is directly proportional to the modulation frequency $F_m$. The phase deviation, $P_r$ is inversely proportional to the square of the distance traversed by the signal for the case where the inverse-square law of signal transmission applies. Thus the direct proportionality with distance brought about by the modulation frequency tends to make the receiver output amplitude fall off directly with distance traversed by the signal, instead of as the square of the distance as would be the case with the conventional amplitude-modulation detection methods.

The phase deviation, $P_r$, is also proportional to the co-efficient of reflection presented by the object to the transmitted wave. This is true since the phase deviation, $P_m$, is directly proportional to the ratio of the reflected and transmitted wave amplitudes. This is a desirable effect since it helps to indicate the nature of the object by giving a relative measure of its reflection co-efficient.

If desired, and as a refinement, a separate coupling may be provided by transmitter 2 to converter 5. Also, the receiving antenna 4 may be highly directional so as to receive only the reflected wave RW. The receiving antenna 4 in this case may then be used to feed automatically volume controlled amplifiers and subsequent limiters which in turn will feed a wave of substantially constant amplitude to the converter 5. With this arrangement care should be taken that the amplified and limited reflected wave is kept to a value which is substantially less than one half the value of the direct wave TW fed to the converter 5 directly from the FM transmitter 2.

It should also be noted that ratio discriminator-detectors which eliminate the necessity for limiting may be employed in the FM discriminator and detector system 9 of Figure 1. In that event limiter 8 may be omitted. A preferred form of ratio discriminator-detector system is described in the copending U. S. patent application of S. W. Seeley, Serial Number 614,956, filed September 7, 1945, now Patent No. 2,497,841 issued February 14, 1950. This preferred form of ratio discriminator detector is also described in Report L. B.-645, dated September 15, 1945, entitled "Ratio Detectors for FM Receivers," issued by Radio Corporation of America, RCA Laboratories Industry Service Division, 711 Fifth Avenue, New York, New York.

What is claimed is:

1. In a distance measuring system wherein a frequency modulated wave is transmitted toward objects that reflect said wave, means for locally generating a frequency modulated wave, means for combining said reflected wave with said locally generated wave, means for amplitude limiting the combined waves, means for frequency demodulating said limited waves, means for heterodyning the demodulated waves with a wave which has been frequency modulated by a sawtooth wave, means for filtering the heterodyned waves to pass only waves in a narrow frequency band corresponding to a certain distance, means for deflecting a cathode ray along a time axis by said sawtooth wave, and means for causing said filtered wave to act upon said cathode ray as it is being deflected along the time axis to produce distance indications thereon.

2. In a distance measuring system wherein a frequency modulated wave is transmitted toward objects that reflect said wave, means for locally generating a frequency modulated wave, means for combining said reflected wave with said locally generated wave, means for frequency demodulating said combined waves, means for heterodyning the demodulated waves with a wave which has been frequency modulated by a sawtooth wave, means for filtering the heterodyned waves to pass only waves in a narrow frequency band corresponding to a certain distance, means for deflecting a cathode ray along a time axis by said sawtooth wave, and means for causing said filtered wave to act upon said cathode ray as it is being deflected along the time axis to produce distance indications thereon.

3. A distance measuring system comprising means including a receiver for obtaining signals of different frequencies corresponding to the distances to objects located at different distances from said system, a heterodyne detector coupled to the output of said means, a scanning oscillator coupled to said heterodyne detector and producing waves which combine with said first waves, a frequency modulator coupled to said scanning oscillator for modulating the frequency of the wave produced by said scanning oscillator, a sawtooth voltage wave generator coupled to said frequency modulator, a band pass filter coupled to the output of said heterodyne detector and selective to separate the waves of different frequencies from one another, a cathode ray tube having two pairs of deflection elements, leads connecting the output of said band pass filter to one pair of said deflection elements, and other leads connecting the output of said sawtooth voltage wave generator to the other pair of deflection elements.

4. In a distance measuring system wherein a frequency modulated wave is transmitted from a transmitter toward one or more objects to be observed and said wave is reflected back from said objects, means for receiving said reflected wave and combining the same with the frequency modulated wave received directly from said transmitter, means for producing beat notes from said combined waves, a limiter for removing the amplitude modulation components from said beat notes, a frequency modulation discriminator-detector circuit coupled to the output of said limiter and producing waves of different frequencies corresponding to objects located at different distances from said transmitter, a heterodyne detector coupled to the output of said discriminator-detector, a scanning oscillator coupled to said heterodyne detector and producing a wave which combines with the output waves from said discriminator-detector, a frequency modulator coupled to said scanning oscillator for modulating the frequency of the wave produced by said scanning oscillator, a sawtooth voltage wave generator coupled to said frequency modulator, a band pass filter coupled to the output of said heterodyne detector and selective to separate the waves of different frequencies from one another, a cathode ray tube having two pairs of deflection elements, leads connecting the output of said band pass filter to one pair of said deflection elements, and other leads connecting the output of said sawtooth voltage wave generator to the other pair of deflection elements.

MURRAY G. CROSBY.

REFERENCES CITED

The following references are of record in the file of this patent:

UNITED STATES PATENTS

| Number | Name | Date |
|---|---|---|
| Re. 21,955 | Chaffee | Nov. 25, 1941 |
| 2,268,587 | Guanella | Jan. 6, 1942 |
| 2,351,240 | Trevor | June 13, 1944 |
| 2,407,169 | Loughren | Sept. 3, 1946 |
| 2,416,351 | Schelleng | Feb. 25, 1947 |
| 2,417,815 | Earp | Mar. 25, 1947 |
| 2,423,644 | Evans | July 8, 1947 |

FOREIGN PATENTS

| Number | Country | Date |
|---|---|---|
| 542,634 | Great Britain | Jan. 21, 1942 |